3,193,462
FROZEN SECTION CLARIFIER
Philip Schain, 126 Silver Lake Road, Staten Island 1, N.Y.
No Drawing. Filed Oct. 31, 1961, Ser. No. 148,853
3 Claims. (Cl. 167—84.5)

This invention relates to a chemical composition adapted and intended for use as a frozen section clarifier to facilitate biopsic examinations, particularly where time is a factor.

In hospitals and clinics a standard procedure for preparing tissue specimens for biopsic examination involves extraction, encasement in paraffin, and cutting of thin (3 to 6 micra) sections through the encased tissue for microscopic examination. While excellent specimen sections are thus obtained, the steps involved in preparing the paraffin blocks are quite time consuming, requiring a minimum of several hours to prepare a tissue specimen for examination. Thus, this method is of no value in instances, as for example during operations, when a quick biopsic examination is needed to guide the physician or surgeon.

In such situations the practice has been to use for quick biopsic examination so-called frozen sections. A tissue specimen is quick-frozen, as for example by means of carbon dioxide, and sliced or sectioned for microscopic examination. While this can be accomplished quickly enough to permit biopsic examinations during the course of an operation, the results are much less satisfactory than with the paraffin block methd, since slides prepared from frozen sections lack the clarity and details which characterize slides prepared from paraffin blocks. This is because tissues hardened by freezing are not as firm as those hardened by encasement with paraffin, so that sections cut from frozen tissues are necessarily thicker than paraffin sections, and because freezing coagulates the surface protein which is deposited around and between the cellular elements, further thickening the section. Microscopic examination of the frozen section is also more difficult because the finely granular coagulated protein has a great affinity for hematoxylin which is used to stain the sections for microscopic examination, and the stained protein tends to fill in, dull and obscure the areas which it covers.

It has now been discovered, in accordance with the present invention, that the difficulties above mentioned as characteristic of normal frozen sections can be substantially overcome, without increasing the time required to prepare sections for microscopic examination, by treating sections cut from a frozen tissue specimen with a novel liquid composition hereinafter referred to as "frozen section clarifier." Not only does the frozen section clarifier provide a clarity and detail in slides prepared from frozen sections approaching that of slides prepared from paraffin blocks, but the manipulation and handling of the sections is also facilitated, since the clarifying composition causes the sections to lie flat on water, eliminates wrinkle formation in mounting on slides, and results in firmer adhesion of sections to slides.

The new compositions useful as frozen section clarifiers are dilute solutions in aqueous saline (approximately the salt content of physiological saline) of mixed nonionic and anionic surface active agents, preferably in the ratio of 20 to 30 parts of anionic to each part by weight of nonionic agent, in association with ethoxytriglycol in the proportion of .75 to 2 times the amount of anionic surface active agent. The anionic and nonionic agents and the ethoxytriglycol preferably account for 8 to 17% (by weight) of the composition, and small amounts of acetone, glycerin and/or alcohols, generally totalling .5 to 1.5% (by weight) of the composition are preferably included, primarily to facilitate blending of the surface active agents with the saline solution, and to solubilize a trace of coloring agent, such as Red Oil O which may be present to impart a desired color to the otherwise clear solution.

The type of variation which can be made in the composition will be apparent from the following tabulation or general formula:

| | Percent by weight |
|---|---|
| Nonionic surface active agent | 0.1 to 0.5 |
| Anionic surface active agent | 3.25 to 9.0 |
| Ethoxytriglycol | 5.75 to 7.5 |
| Trimethyl nonanol | 0.4 to 0.55 |
| Methanol | 0 to 0.03 |
| Acetone | 0.12 to 0.45 |
| Sodium chloride | 0.75 to 0.9 |
| Glycerin | 0 to 0.4 |
| Oil Red-O dye (or other coloring agent) | 0 to trace |
| Water (deionized) | 80 to 90 |

In varying amounts of the several components, particularly the surface active agents and the ethoxytriglycol, one should keep within the preferred proportions above described.

In general, nonionic surface active agents in which the hydrophillic component is a polyoxyethylene moiety, are suitable for use in the composition, typical examples being:

Tetradecyldesoxypolyethyleneglycol (TD 750)
Polyoxyethylene sorbitan monolaurate (Tween 20)
Polyoxyethylene sorbitan monolaurate (Tween 21)
Polyoxyethylene sorbitan monopalmitate (Tween 40)
Alkylarylpolyethoxy ethanol (Triton X–100)
Alkylphenoxypolyethoxy ethanol (Triton X–155)
Iso-octylphenoxyethoxy ethanol (Triton A–20)
Alkyl phenyl polyethyleneglycol ethers (Tergitol NP–27)

Anionic surface active agents suitable for use in the composition include in general, the higher alkyl phosphates, sulfates and sulfonates, typical examples being:

Dioctyl sodium phosphate
Sodium tetradecyl sulfate
Triethanolamine tetradecyl sulfate
Sodium octyl sulfate
Diamyl sodium sulfosuccinate
Diisobutyl sodium sulfosuccinate
Sodium lauryl sulfate.

It should be noted that in a co-pending application Serial No. 766,695, filed October 13, 1958, since issued as United States Patent No. 3,062,623, dated November 6, 1962, relating to reagents for separating fat, particularly from blood serum, mixtures of similar surface active agents in combination with ethoxytriglycol have been disclosed. The products of said co-pending application are not suitable, however, for use as frozen section clarifiers, and conversely, the compositions of the present application are not suitable as reagents for separating fat from blood serum.

The differences in the two concepts may be briefly summarized as follows: The frozen section clarifier compositions are much more dilute with respect to the surface active agents, containing only one-third to one-half the quantity needed in the blood serum reagents. Even more important, however, is the substantially higher proportion of ethoxytriglycol to anionic agent in the frozen section clarifier. This appears to be responsible for the effective flushing out of protein materials precipitated by freezing in the cell structure of frozen sections.

The following example shows a typical frozen section clarifier composition in accordance with the present invention, but it is to be understood that this example is given by way of illustration and not of limitation:

Example

A frozen section clarifier composition is prepared having the following composition:

| | Parts by weight |
|---|---|
| Alkyl phenyl polyethylene glycol ether (Tergitol NP-27) | .13 |
| Dioctyl sodium phosphate | 3.52 |
| Ethoxytriglycol | 5.88 |
| Trimethyl nonanol | .44 |
| Methanol | .02 |
| Acetone | .14 |
| Oil Red-O dye | Trace |
| Sodium chloride | .8 |
| Glycerin | .37 |
| Water | 88.7 |

In preparing this composition, separate mixtures are prepared of:

(a) The alkyl phenyl polyethylene glycol ether and the trimethyl nonanol.

(b) The dioctyl sodium phosphate and the ethoxytriglycol.

(c) The methanol and acetone with the Red-O dye at approximately a 2000 to 1 dilution.

(d) The sodium chloride and water with glycerin added thereto.

These are combined by adding mixture (a) to mixture (b), then adding mixture (c) and finally adding the saline solution (d). Each of these mixing operations is effected with careful stirring, to minimize foaming, until uniformity is obtained before the next component is added. The resulting composition is clear and transparent with a faint pink color, and can be stored indefinitely in stoppered containers for use, full strength, as a frozen section clarifier.

The use of the clarifier in the preparation of frozen sections for study, presents no procedural problems. A tissue sample is initially treated with formalin, as for example, by bringing to a boil in 10% formalin or heating to about 60° C. in undiluted formalin, and then cooled and washed under running water, after which it is quick-frozen with $CO_2$. Sections approximately 15 micra thick are cut and placed in a container of water. Now, instead of simply selecting desired samples for preparing slides, the selected sections are dipped into the clarifier solution (about 5 cc. in an open dish) for a period of about 5 seconds and then returned to water. The cleared sections float smoothly on the water and can be readily floated onto albumin coated slides and dried and stained in the usual way. With the cleared sections, it is found that the sections readily lie flat and wrinkle-free on the slides and adhere firmly.

The immersion time of 5 seconds in the clarifier solution has been found to give consistently good results, although good clarification can frequently be obtained with a 1 to 2 second immersion, and no damage to the sections result if they remain immersed as long as 10 to 15 seconds.

When sections so treated are viewed microscopically, the skilled technician can readily note that the sharply demarcated cellular boundaries, the clearly defined nuclei, and the chromatin detail are quite unlike normal (untreated) frozen sections and closely approach the clarity which is characteristic of paraffin sections.

Various changes and modification in the compositions herein described may occur to those skilled in the art, and to the extent that such changes and modifications are embraced by the appended claims, it is to be understood that they constitute part of my invention.

I claim:

1. A frozen section clarifier composition comprising an aqueous saline solution containing by weight:

| | Percent |
|---|---|
| Nonionic surface active agent | 0.1 to 0.5 |
| Anionic surface active agent | 3.25 to 9.0 |
| Ethoxytriglycol | 5.75 to 7.5 |
| Trimethyl nonanol | 0.4 to 0.55 |
| Methanol | 0 to 0.03 |
| Acetone | 0.12 to 0.45 |
| Sodium chloride | 0.75 to 0.9 |
| Glycerin | 0 to 0.4 |
| Coloring agent | 0 to trace |
| Water (deionized)—to 100% | 80 to 90 | surface active agents in the proportion of 1 part nonionic to 20–30 parts anionic by weight and ethoxytriglycol accounting for about .8 to 17% of the total weight of said solution, and the ethoxytriglycol being present in the proportion of .7 to 2 times the weight of anionic surface active agent.

2. A frozen section clarifier composition as defined in claim 1 wherein the nonionic surface active agent is alkyl phenyl polyethylene glycol ether and the anionic surface active agent is dioctyl sodium phosphate.

3. A frozen section clarifier composition comprising an aqueous saline solution containing by weight:

| | Percent |
|---|---|
| Alkyl phenyl polyethylene glycol | 0.13 |
| Dioctyl sodium phosphate | 3.52 |
| Ethoxytriglycol | 5.88 |
| Trimethyl nonanol | 0.44 |
| Methanol | 0.02 |
| Acetone | 0.14 |
| Oil Red-O dye | Trace |
| Sodium chloride | 0.8 |
| Glycerin | 0.37 |
| Water (deionized) | 88.7 |

References Cited in the file of this patent

UNITED STATES PATENTS

| 2,863,734 | Schain | Dec. 9, 1958 |
| 3,062,623 | Achain | Nov. 6, 1962 |

JULIAN S. LEVITT, *Primary Examiner.*

MORRIS O. WOLK, FRANK CACCIAPAGLIA, JR.,
*Examiners.*